United States Patent
Fendt et al.

(10) Patent No.: US 6,422,596 B1
(45) Date of Patent: Jul. 23, 2002

(54) OCCUPANT PROTECTION SYSTEM HAVING A CENTRAL UNIT, SENSORS AND A PLURALITY OF CONTROL MODULES WHICH ARE CONNECTED BY MEANS OF A BUS SYSTEM

(75) Inventors: Guenter Fendt, Schrobenhausen; Michael Bischoff, Adelschlag; Johannes Rinkens, Ingolstadt; Stefan Schaeffer; Peter Steiner, both of Schrobenhausen; Werner Nitschke, Ditzingen; Otto Karl, Leonberg; Joachim Bauer, Oberstenfeld, all of (DE)

(73) Assignees: Temic Telefunken microelectronic GmbH, Heilbronn; Robert Bosch GmbH, Stuttgart, both of (DE)

(*) Notice: Subject to any disclaimer, the term of this patent is extended or adjusted under 35 U.S.C. 154(b) by 0 days.

(21) Appl. No.: 09/647,334
(22) PCT Filed: Mar. 9, 1999
(86) PCT No.: PCT/EP99/01502
  § 371 (c)(1),
  (2), (4) Date: Sep. 27, 2000
(87) PCT Pub. No.: WO99/50096
  PCT Pub. Date: Oct. 7, 1999

(30) Foreign Application Priority Data
Mar. 28, 1998 (DE) .......................................... 198 13 957

(51) Int. Cl.$^7$ .............................................. B60R 21/00
(52) U.S. Cl. ........................................ 280/735; 701/45
(58) Field of Search .............................. 701/45; 280/735

(56) References Cited
U.S. PATENT DOCUMENTS

| | | | | |
|---|---|---|---|---|
| 5,712,794 A | * | 1/1998 | Fendt et al. | 364/424.055 |
| 5,760,489 A | * | 6/1998 | Davis et al. | 307/10.1 |
| 5,825,098 A | * | 10/1998 | Dabry et al. | 307/10.1 |
| 5,835,873 A | * | 11/1998 | Darby et al. | 701/45 |
| 5,899,949 A | * | 5/1999 | Kincaid | 701/45 |
| 5,928,300 A | * | 7/1999 | Rogers et al. | 701/45 |
| 5,961,816 A | * | 10/1999 | Kincaid | 701/45 |
| 5,964,815 A | * | 10/1999 | Wallace et al. | 701/45 |
| 6,070,114 A | * | 5/2000 | Fendt et al. | 701/45 |

FOREIGN PATENT DOCUMENTS

| | | |
|---|---|---|
| DE | 19527813 | 10/1996 |
| DE | 19616293 | 10/1997 |
| DE | 19619117 | 11/1997 |
| DE | 19653794 | 7/1998 |
| EP | 0693401 | 1/1996 |
| WO | WO89/09146 | 10/1989 |

OTHER PUBLICATIONS

An article "Vernetzte Rückhaltesysteme" by Mr. Bischoff, in the magazine *Automobil–Produktion*, Jun. 1997, Issue 3/97 p. 84 f.

* cited by examiner

Primary Examiner—J. J. Swann
Assistant Examiner—L. Lum
(74) Attorney, Agent, or Firm—W. F. Fasse; W. G. Fasse

(57) ABSTRACT

In occupant protection systems having a large number of sensors and control modules for triggering occupant protection devices, the amount of wiring is significantly increased if they are to be communicatively connected to a central unit. For this reason, bus systems have already been suggested for the control modules for triggering occupant protection devices. In order to further reduce in the wiring, sensors are at least partially integrated into a bus system with additional control modules that are allocated to these sensors. Within the context of a diagnosis process of interrogation and response, which triggers a function test of the control modules for triggering the occupant protection devices, an actual sensor value is sent to the bus system from the control modules of the sensors as a diagnosis response. This response is processed by the central unit and/or the other control modules.

9 Claims, 1 Drawing Sheet

OCCUPANT PROTECTION SYSTEM HAVING A CENTRAL UNIT, SENSORS AND A PLURALITY OF CONTROL MODULES WHICH ARE CONNECTED BY MEANS OF A BUS SYSTEM

FIELD OF THE INVENTION

The invention relates to an occupant protection system having a central unit, sensors and a plurality of control modules communicatively connected by a bus system for triggering occupant protection devices, especially in motor vehicles.

BACKGROUND INFORMATION

Such occupant protection systems are known, for example from the German Patent Publication DE 196 53 794 or DE 196 16 293. These publications also describe the bi-directional data transmission for the diagnosis of the control modules, wherein preferably a control information, referred to hereafter as diagnosis interrogation, is sent from the central unit to the control modules. The control modules respond to the interrogation with a control information or a diagnosis interrogation. This diagnosis operation serves for cyclical checking of the functional capability and of individual functional parameters of the control modules of the occupant protection devices.

Previously, the characteristic sensors for occupant protection systems, for example acceleration sensors, have always been connected separately and individually with the central unit. In the future, these sensors will be supplemented by seat occupancy and position sensors, safety belt lock sensors, approach sensors, etc. Conventionally, these sensors transmit continuously and unilaterally sensor signals to the central unit. As a result, the effort and expense for wiring and control in the central unit, and the number of inputs to the central unit, is continuously increasing. An article "Vernetzte Rückhaltesysteme" (Linked Restraining Systems) by Mr. Bischoff, in the magazine *Automobil-Produktion*, June 1997, Issue 3/97, page 84 f., describes sensors in a bus system for triggering occupant protection devices, a so-called ignition bus. However, how the sensors were integrated into the bus system cannot be discerned from the article.

PCT Publication WO 89/09146 discloses on the one hand a sensor databus and on the other hand an actuator databus that are separate from each other.

Moreover, German Patent Publication DE 195 27 813 C1 discloses, for example, restraining devices for occupants that provide an acceleration-dependent safety switch which is integrated into the ignition system. The central evaluation device can, however, not access the data from this sensor and, therefore, cannot use this data for trigger decisions of other restraining devices. In the diagnosis inquiry provided for the protection device, only the functional capability is reported back to the central unit. Thus, sensors having universal significance for the trigger behavior of the entire occupant protection system cannot be integrated in this manner. As a result, ever more sensors must be provided that are communicatively connected with the central unit.

SUMMARY OF THE INVENTION

It is an object of the invention to provide an occupant protection system in which the effort and expense for wiring can be reduced by integrating sensors into a bus system that connects protection device modules to a central control.

This object has been achieved by the combination of the following features. More specifically, an occupant protection system according to the invention comprises a central control unit including interrogation means for generating interrogation signals, a signal transmitting databus connected to said central control unit, a plurality of occupant protection devices and a corresponding plurality of control modules arranged in pairs so that each pair comprises one control module and one respective occupant protection device, said pairs being connected through said signal transmitting databus to each other and to said central control unit for communicating with said central control unit including responding to said interrogation signals and for transmitting diagnosis responses from said protection device to said central control unit, said system further comprising at least one sensor and at least one sensor control module forming at least one further pair with said at least one sensor, wherein said at least one further pair is also connected through said signal transmitting databus to said central control unit for responding to said interrogation signals and transmitting a sensor response, whereby said first mentioned pairs and said at least one further pair respond to the same said interrogation signals.

According to the invention there is further provided an occupant protection system for a vehicle comprising a central control unit, at least one first sensor for sensing vehicle characteristics, said at least one first sensor being directly connected to said central control unit, first pairs of occupant protection devices and respective control modules, each first pair comprising an occupant protection device and a respective control module connected to a respective occupant protection device to form said first pairs, a data transmission bus connecting said first pairs to said central control unit and to each other for responding to interrogation signals from said central control unit, at least one second pair comprising a sensor control module and an occupant sensor connected to said sensor control module, said data transmission bus also connecting said at least one second pair to said central control unit for responding to said interrogation signals from said central control unit, whereby said first mentioned pairs and said at least one further pair respond to the same said interrogation signals.

According to the invention there is further provided a method for operating an occupant protection system including a central control unit, a plurality of occupant protection devices, a plurality of sensors, and a data transmission bus connecting said occupant protection devices to said central control, said method comprising the following steps:

(a) dividing said sensors into a first group of sensors and a second group of sensors, said first group of sensors including vehicle characteristic sensors, said second group including occupant sensors;

(b) connecting said first group of sensors directly to said central control independently of said data transmission bus;

(c) connecting said second group of sensors through said data transmission bus to said central control together with said occupant protection devices;

(d) generating interrogation signals; and (e) interrogating said occupant protection devices and said second group of sensors through said data transmission bus with said interrogation signals for obtaining diagnosis information from said occupant protection devices and for obtaining statues information from said occupant sensors with the same interrogation signals.

The basic concept of the invention is to interconnect, in addition to the control modules of the occupant protection devices, the control module or modules of the sensors to each other and to a central unit by a bus system whereby the amount of wiring is significantly reduced. Such interconnection is particularly advantageous because the sensors are usually distributed spatially in the vehicle at substantial distances from the central unit. In a multitude of cases, however, the occupant protection devices themselves are also spatially arranged in these areas. In part, these occupant protection devices are already grouped together as so-called "external assistants". In that case the sensors, however, are no longer directly connected to the central unit. By making use particularly of a bi-directional dialog that has previously been used for diagnosis of the control modules of the occupant protection devices, it is rather simple to link at least certain individual sensors through this bus system to the central unit. This is done according to the invention by allocating to the sensors corresponding control modules that transmit back the actual sensor value as a diagnosis response to a diagnosis interrogation. This approach provides the special advantage that control modules that are almost identical to those for the occupant protection devices can be used. Further, the technical software transmission protocol can remain almost unchanged since, with respect to the protocol, only the number of the control modules increases; the dialog, however, remains externally initially identical.

The processor logic processing can be distributed from the central unit to the individual control modules by providing the control modules of the occupant protection devices, in addition to the central unit as is conventionally done, with means that enable them to detect or acquire the sensor signals transmitted to the bus system as a diagnosis response. This feature increases the reaction capability of the control modules.

In order to integrate the sensors into the bus system of an occupant protection system, however, it is necessary that the values to be detected, are in fact detected or acquired cyclically. The cyclical repetition interval, that is, the time duration between two diagnosis or interrogation cycles for the control module of a sensor, must be taken into consideration due to the always limited data transmission speed. A multitude of control modules, for example with sequential multiplexing, leads to an increased number of time windows within a protocol framework. Consequently, the cyclical repetition interval may acquire a length that is not always negligible.

Certain values to be detected, which are important for the occupant protection system, exhibit a high dynamic characteristic, that is, they have a high rate of change as a function of time. For example, the acceleration signals, are very dynamic. Occupant protection systems are, however, particularly time critical because of the brief time span between a first recognizable sensor signal and the time in which the occupant protection devices must be triggered if they are to provide their optimal protection effect.

It can therefore be advantageous to integrate only those sensors through the control modules into the bus system, which detect values that change relatively slowly relative to the shortest possible cycle repetition interval, or which change, for example, during the non-operative state of a stationary vehicle.

It is also possible to ensure that all changes are detected by adapting the cycle repetition interval to correspond to the rate of change of the value to be detected. This must be considered in individual cases, based on the actual technical conditions.

In a further advantageous embodiment, the diagnosis interrogation of and/or the response from the control modules of at least individual sensors is suppressed when a control information indicating a safety critical state, particularly a trigger command, has been sent to at least one of the control modules.

The invention will be explained in more detail below, with reference to example embodiments and figures.

DETAILED DESCRIPTION OF PREFERRED EXAMPLE EMBODIMENTS AND OF THE BEST MODE OF THE INVENTION

Figure 1:
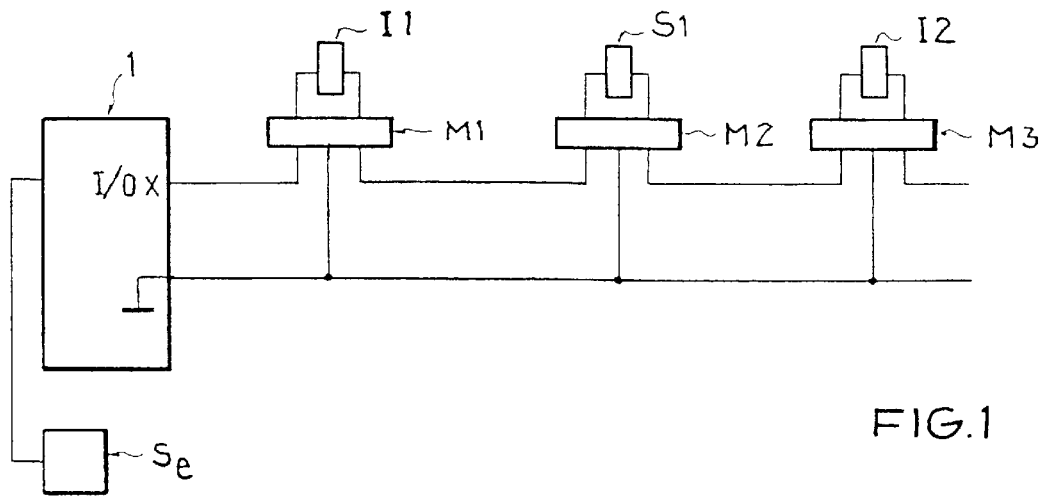
FIG. 1 shows a bus system with control modules for triggering occupant protection devices and for sensors.

FIG. 1 shows an occupant protection system having a central unit 1, sensors Se and S1 and a plurality of control modules M1, M3, . . . , for triggering the occupant protection devices I1, I3, . . . The control modules M1, M3, . . . are connected, so as to be able to communicate, by means of a bus system to one terminal I/Ox of the I/O terminals of the central unit 1.

The sensor Se is conventionally connected separately to the central unit 1, because this sensor Se detects in an analog manner signals of very rapidly changing values, such as the acceleration acting on the vehicle. This sensor was not integrated into the bus system in order to assure processing of the signal in quasi real-time.

By contrast, the sensor S1, for example a safety belt sensor, changes its condition more slowly or in a time frame that is not critical to safety, for example, when the vehicle is standing still. This sensor S1 is integrated through the control module M2 into the bus system. The sensor S1 is, for example an occupancy switch sensor and/or a seatbelt sensor. All control modules M1, M2, M3, . . . are preferably all constructed identically and their respective functions are programmed by software.

Figure 2:
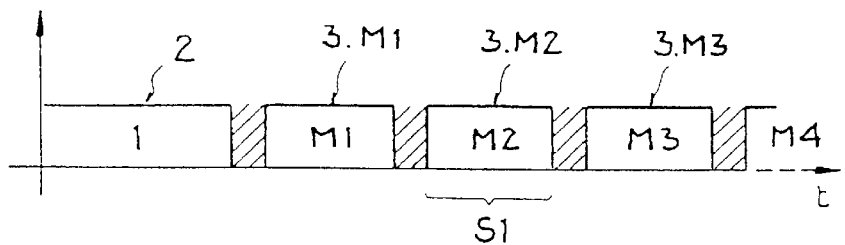
FIG. 2 shows a transmission protocol with broadcast diagnosis interrogation and symmetrical multiplexing of the individual control modules.
Figure 3:
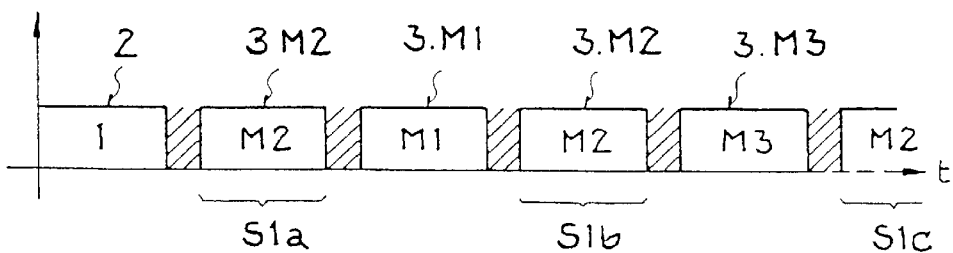
FIG. 3 shows a transmission protocol with broadcast diagnosis interrogation and asymmetrical multiplexing, wherein the control module of the sensor responds during every second time window.

In FIGS. 2 and 3 the integration of the sensors into the process of diagnosis interrogation and diagnosis response can be particularly well followed. In both figures the diagnosis interrogation 2 of the central unit 1 is represented as a broadcast interrogation, that is, it goes to all control modules M1, . . . in common. This again shortens the protocol duration. Basically, however, it is alternatively possible to provide an individual diagnosis interrogation through the address of the control modules.

The control modules Mx respond to the interrogation 2 with their respective diagnosis response 3.Mx. While the response from the control modules M1, M3, . . . of the occupant protection devices I1, I2, . . . is primarily only a status information such as defective or not defective, an actual sensor value of the sensor s1 is sent by the control module M2 to the bus system as the diagnosis response 3.M2 to the diagnosis inquiry 2. This diagnosis response 3.M2 can be recognized by the individual control modules M1, M3, . . . of the occupant protection devices I1, I2, . . . , and by the central unit 1. The diagnosis response 3.M2 is taken into consideration and, if required, actions can be triggered by the respective control modules. Following the diagnosis response 3.M2, all other control modules M3, . . . shown in FIG. 2 then respond until the process is repeated by a renewed diagnosis interrogation 2 from the central unit 1.

In contrast thereto, the process in FIG. 3 provides for an asymmetrical time or multiplexing on the bus system. Between the diagnosis responses 3.M1, 3.M3, . . . of the control modules M1, M3, . . . of the occupant protection devices I1, I2, . . . , an actual sensor value s1a, s1b, s1c, . . . of the sensor s1 is sent each time from the control module M2 to the bus system. Thus, the control module of the sensor s1 responds much more frequently, compared to the control modules M1, M3, . . . of the occupant protection devices I1, I2, . . . The central unit 1 and possibly also the control modules M1, M3, . . . of the occupant protection devices I1, I2, . . . thus receive much more rapidly a changing sensor value s1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An occupant protection system comprising a central control unit (1) including interrogation means for generating interrogation signals, a signal transmitting databus connected to said central control unit, a plurality of occupant protection devices (I1, I2, . . . ) and a corresponding plurality of control modules (M1, M3, . . .) arranged in pairs so that each pair comprises one control module and one respective occupant protection device, said pairs being connected through said signal transmitting databus to each other and to said central control unit for communicating with said central control unit including responding to said interrogation signals and for transmitting diagnosis responses from said protection devices to said central control unit, said system further comprising at least one sensor (S1) and at least one sensor control module (M2) forming at least one further pair with said at least one sensor (S1), wherein said at least one further pair is also connected through said signal transmitting databus to said central control unit for responding to said interrogation signals and transmitting a sensor response, whereby said first mentioned pairs and said at least one further pair respond to the same said interrogation signals.

2. The occupant protection system of claim 1, wherein said corresponding plurality of control modules (M1, M3), comprises means for evaluating said diagnosis responses from said occupant protection devices.

3. The occupant protection system of claim 1, wherein said plurality of control modules (M1, M3) and said at least one sensor control module (M2) are of identical construction.

4. The occupant protection system of claim 1, wherein said at least one sensor (31) detects an occupant dependent characteristic.

5. An occupant protection system for a vehicle comprising a central control unit (1), at least one first sensor (Se) for sensing vehicle characteristics, said at least one first sensor being directly connected to said central control unit, first pairs of occupant protection devices and respective control modules (M1, M2), each first pair comprising an occupant protection device (I1, I2) and a respective control module (M1, M3) connected to a respective occupant protection device to form said first pairs, a data transmission bus connecting said first pairs to said central control unit and to each other for responding to interrogation signals from said central control unit, at least one second pair comprising a sensor control module (M2) and an occupant sensor (S1) connected to said sensor control module (M2), said data transmission bus also connecting said at least one second pair to said central control unit (1) for responding to said interrogation signals from said central control unit, whereby said first mentioned pairs and said at least one further pair respond to the same said interrogation signals.

6. The occupant protection system of claim 5, wherein said at least one first sensor (Se) detects signals of rapidly changing values of said vehicle characteristics which are transmitted directly to said central control unit, and wherein said occupant sensor (S1) detects slowly changing occupant dependent characteristics which are transmitted by said data transmission bus to said central control unit.

7. The occupant protection system of claim 6, wherein said at least one first sensor (Se) is an analog sensor directly connected to said central processing unit for processing said rapidly changing values in quasi real-time.

8. The occupant protection system of claim 5, wherein said first mentioned control modules (M1, M3) and said at least one sensor control module (M2) are of an identical construction.

9. A method for operating an occupant protection system including a central control unit, a plurality of occupant protection devices, a plurality of sensors, and a data transmission bus connecting said occupant protection devices to said central control, said method comprising the following steps:

(a) dividing said sensors into a first group of sensors and a second group of sensors, said first group of sensors including vehicle characteristic sensors, said second group including occupant sensors;

(b) connecting said first group of sensors directly to said central control independently of said data transmission bus;

(c) connecting said second group of sensors through said data transmission bus to said central control together with said occupant protection devices;

(d) generating interrogation signals; and (e) interrogating said occupant protection devices and said second group of sensors through said data transmission bus with said interrogation signals for obtaining diagnosis information from said occupant protection devices and for obtaining status information from said occupant sensors with the same interrogation signals.

* * * * *

UNITED STATES PATENT AND TRADEMARK OFFICE
CERTIFICATE OF CORRECTION

PATENT NO.   : 6,422,596 B1
DATED        : July 23, 2002
INVENTOR(S)  : Fendt et al.

It is certified that error appears in the above-identified patent and that said Letters Patent is hereby corrected as shown below:

Title page,
Item [56], References Cited, U.S. PATENT DOCUMENTS,
Replace "5,712,794" by -- 5,712,784 --.
Replace "Dabry et al." by -- Darby et al. --;
Replace "5,961,816" by -- 5,964,816 --.

Column 5,
Line 56, after "sensor", replace "(31)" by -- (S1) --.

Signed and Sealed this

Twenty-sixth Day of November, 2002

*Attest:*

JAMES E. ROGAN
*Attesting Officer*     *Director of the United States Patent and Trademark Office*